United States Patent Office 3,398,018
Patented Aug. 20, 1968

3,398,018
TRANSPARENT FLAT COATED SUBSTRATES
Harold A. Walters, Beaverton, Mich., assignor to The Dow Chemical Company, Midland, Mich., a corporation of Delaware
Filed Sept. 25, 1964, Ser. No. 399,257
9 Claims. (Cl. 117—124)

ABSTRACT OF THE DISCLOSURE

Flat transparent coatings with excellent resistance to burnishing and having self-healing characteristics are obtained by incorporating small transparent plastic spheres in a plastic matrix. The physical properties of the spheres and refractive index difference are particularly significant in obtaining coatings which have optimum properties.

This invention relates to transparent flat antigloss coatings and, more particularly, relates to coatings of diverse synthetic resinous materials which exhibit low gloss.

Oftentimes it is desired to provide transparent coatings which do not have a high gloss and are readily deposited from a liquid coating system. Such transparent coatings are known, but most systems provide an obviously irregular or pebbled surface which frequently is undesirable if the detail of the underlying surface is to be readily observed. For example, frequently it is desired to provide a finish for a wood having a particularly attractive or delicate grain which is non-glossy flat, non or poorly reflective and yet permit the grain to be viewed with ease and in full detail.

Oftentimes it is desired to have glass surfaces or transparent plastic surfaces provided with a coating that will markedly reduce the reflection and yet permit a relatively clear view of the underlying material. Many attempts have been made to prepare such coatings. However, they most frequently suffer from the defects of a relatively rough surface, that is, a surface that appears to the unaided eye as rough and suggests a pattern similar to that observed on an egg shell.

Various flatting agents have been employed, such as calcium carbonate, silica and the like. Oftentimes the opacity of the coatings increases very rapidly with the addition of such agents and, when a sufficient degree of flatting is obtained, the coatings no longer have the desired transparency. Other attempts have been made utilizing various solid additaments, but the coatings suffer from the defect of burnishing. Many such transparent coatings, when rubbed with the hand or a soft cloth, develop a considerable gloss which is permanently retained.

It is an object of this invention to provide an improved flat coating which is transparent and has a low direct reflectance.

A further object of the invention is to provide a flat coating which, when burnished, is substantially self-healing.

A further object of the invention is to provide an improved glass coating of good antiburnishing properties.

These benefits and other advantages in accordance with the present invention are achieved in a coating comprising a synthetic resinous matrix being generally transparent to light and having a modulus of elasticity at 300 percent elongation of from about 230 pounds per square inch to about 1450 pounds per square inch at 75° Fahrenheit and 50 percent relative humidity, and being sufficiently flexible that a 3 mil thick dry film adhered to a 10 mil thick steel panel may be bent about a ⅛ inch diameter mandrel without cracking, the matrix containing from 10 to 40 volume percent transparent spheres of a diameter from about 3 to 20 microns. The difference in refractive index of spheres and the matrix being not greater than about 0.03, the resultant coating having a 60 degree gloss measurement of not over 16 percent and an 85 degree gloss measurement of not over 11 percent and an opacity of not over about 6 percent.

These benefits and other advantages in accordance with the present invention will become more apparent from the following specification when taken in connection with the drawing wherein.

Figure 1:
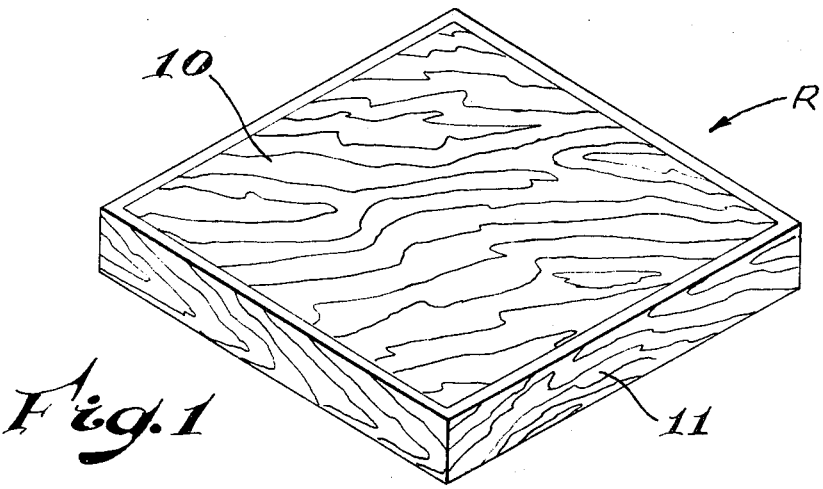
FIGURE 1 is a representation of a wood substrate having a coating in accordance with the invention.

In FIGURE 1 there is illustrated an antigloss coating in accordance with the invention generally designated by reference numeral 10 overlying a decorative wood substrate 11.

Figure 2:
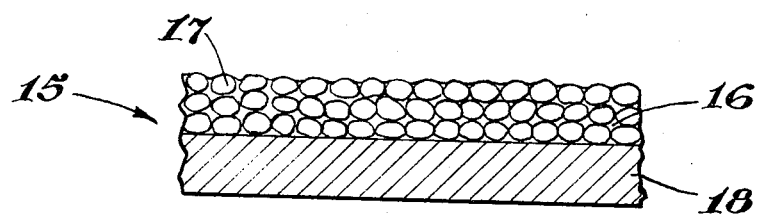
FIGURE 2 is a sectional schematic representation of a coating in accordance with the invention on a substrate.

In FIGURE 2 there is illustrated a coating in accordance with the invention generally designated by the reference numeral 15. The coating 15 comprises a synthetic resinous thermoplastic matrix 16 containing a plurality of generally spherical resinous particles 17 disposed upon a substrate 18.

Figure 3:
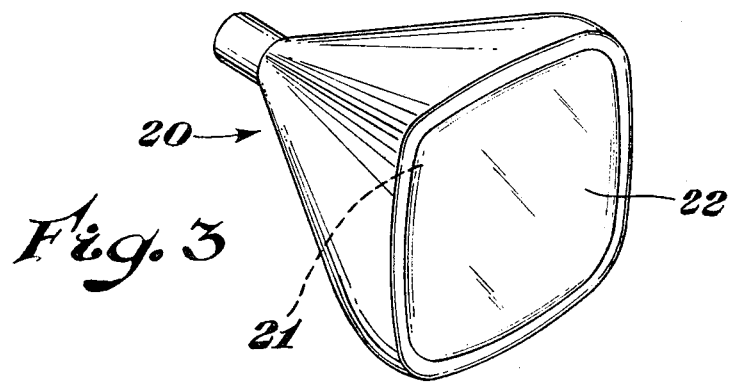
FIGURE 3 illustrates a coating in accordance with the invention disposed on the surface of a cathode ray tube.

In FIGURE 3 there is illustrated a cathode ray tube generally designated by the reference numeral 20. The cathode ray tube 20 has a viewing screen 21. A coating 22 in accordance with the invention is disposed over the viewing surface of the cathode ray tube 20.

Spherical resinous plastic particles in accordance with the invention must have a diameter lying between 3 and 20 microns. If the diameter of the particle exceeds 20 microns the coating is undesirably rough and unattractive. If the diameter is below about 3 microns, suitable flatting is not obtained for most applications. Beneficially, between about 5 and 15 microns are desirable. The resinous material employed to form the solid generally spherical particles must have a heat distortion temperature of at least about 100° Fahrenheit in accordance with the American Society for Testing Materials, Test D648–56, that is, 100° Fahrenheit under a pressure of 264 pounds per square inch. Plastic spheres having heat distortion temperatures lower than 100° Fahrenheit may be employed for the formation of coating flat coatings, but are sufficiently soft that adequate anti-burnishing properties are not obtained in the coating. Many thermoplastic substances are readily employed to form the spheres suitable for the practice of the present invention and include polyvinyl acetate, polyvinyl chloride, polystyrene, linear polyethylene, polypropylene, cellulose acetate, ethyl cellulose, methy methacrylate, and the like. Also beneficially employed in the practice of the present invention are spheres formed from thermosetting materials such as epoxy and polyurethane resins. However, such materials generally should not be extremely brittle in order that dusting be avoided while handling the spherical particles. Suitable spherical particles from the present invention are provided by several methods including the heating of a particulate thermoplastic resinous material in a liquid which is a non-solvent therefor to a temperature sufficiently high that the material reaches a thermoplastic state and surface tension causes it to deform into a spherical particle. Beneficially such techniques are advantageously employed with materials such as polyethylene, polypropylene, polystyrene, and the like, and suitable non-solvent media such as water. Oftentimes such particles are polymerized to the desired size and configuration.

Polymer particle having sizes, such as from about 3 microns to about 40 microns, may be prepared, for example, by the method described in Canadian Patent 656,447.

Generally the synthetic resinous particles of a suitable particle size are dispersed within a binder medium which may be any film forming polymeric material that does not attack and destroy the spherical particles. Such a binder material may be film forming at room temperature or below room temperature or by baking at elevated temperatures dependent upon the characteristics of the spherical particles employed and the desired end use of the coating composition. However, the binder in the finished film, to have anti-burnishing characteristics in accordance with the invention, must be solid and have a modulus of elasticity of 300 percent elongation of at least 230 pounds per square inch at 75° Fahrenheit and 50 percent relative humidity to avoid excessive tackiness and not over 1450 pounds per square inch. A higher modulus tends to reduce or eliminate the anti-burnishing characteristics.

Further, the binder material must be flexible. A three mil film of the binder material when deposited on a 10 mil steel test panel must not crack when the test panel is bent over a 1/8 inch mandrel at 25° centigrade. Thus, the resultant flat coatings are tough, anti-burnishing, and exhibit a pleasing flat appearance. Suitable binders are found among the transparent coating compositions such as synthetic latexes of thermoplastic polymers, lacquers and the like. Beneficially, for most operations, it is desirable to employ a synthetic resinous latex or dispersion of film forming polymer particles in an aqueous coating medium. Employing an aqueous vehicle permits the ready addition of the spherical particles to the latex composition and dilution with water to the desired degree. As the vehicle in the synthetic latex is water, no problem is encountered of attack on the spherical particles by the vehicle and fire hazards are substantially eliminated, and the systems can be rapidly dried. In order to attain a satisfactory flat film it is essential that the refractive index of the transparent polymer and the transparent matrix or binder be within 0.03 of each other, and preferably within 0.015. If the refractive index difference is greater than 0.03, the coatings tend to be opaque and unattractive. Further, the opacity of the coating must not be greater than about 6 percent. By opacity is meant the opacity of a film measured by Federal Test Method Standard No. 141, Method 4121. The percent gloss of the film when measured in accordance with Federal Test Method Standard No. 121, Methods 6101 and 6103, provide 60° and 85° gloss measurements with a Gardner multiangle gloss meter, GG–9095, should provide gloss measurements not in excess of 16 percent at 60° and 11 percent at 85°. The spherical particles or microspheres should be present in the binder in a volume concentration of from about 10 to about 40 percent volume concentrations below about 10 percent by volume of the composite film lead to coatings that are excessively glossy, whereas volume concentrations greater than 40 percent result in coatings which tend to show a blushing or whitening. Preferably the volume concentration of the particles within the dry, flat coating is from about 25 to about 35 volume percent.

By way of further illustration a plurality of thermoplastic resinous particles are prepared by limited coalescence polymerization in aqueous suspension. The aqueous phase comprises 100 parts by weight water, 15 parts by weight of a 30 percent solution of colloidal silica dispersion in water. The colloidal silica dispersion is commercially available under the trade name of Ludox HS. To this mixture is added 2½ parts of a 10 weight percent aqueous solutions of a copolymer prepared from diethanol amine and adipic acid in equimolar proportions by carrying out a condensation reaction to give a product having a viscosity of 100 centipoises at 25° centigrade. One part of a solution containing 2.5 weight percent potassium dichromate is added to the aqueous phase and the pH of the aqueous solution adjusted to 4. The aqueous phase is placed in a polymerization reactor equipped with an agitator and 100 parts by weight of monomer containing 1/10 part by weight of benzoyl peroxide is added. The oil and water phases were mixed by violent agitation by a blade rotating at a speed of about 10,000 r.p.m. The reactor is immediately sealed and heated to a temperature of about 80° centigrade for a period of 24 hours. At the end of this period the temperature is lowered and the reaction mixture has the appearance of a white milky liquid similar to a chalk-white milk. A portion of the reaction mixture is examined under a microscope to determine the particle size of the resultant polymer beads. The results are set forth in Table I and each of the runs designated by a sample number. The refractive index of polymer is also determined.

TABLE I.—COMPOSITION OF MICROSPHERES

| Sample No. | Composition | Particle Size, microns | Refractive Index | Heat Distortion Temp., °F. |
|---|---|---|---|---|
| 1 | 100% methylmethacrylate | 3–12 | 1.4903 | 208 |
| 2 | 80% methylmethacrylate/20% styrene | 3–12 | 1.5093 | 202 |
| 3 | 60% methylmethacrylate/40% styrene | 3–12 | 1.5280 | 196 |
| 4 | 40% methylmethacrylate/60% styrene | 3–12 | 1.5470 | 192 |
| 5 | 20% methylmethacrylate/80% styrene | 3–12 | 1.5447 | 184 |
| 6 | 100% styrene | 3.12 | 1.5843 | 178 |
| 7 | 100% methylmethacrylate | 6 | 1.4903 | 208 |
| 8 | do | 10 | 1.4903 | 208 |
| 9 | do | 14 | 1.4903 | 208 |

A plurality of binder compositions are employed in the form of latexes having 40 percent solids latex or aqueous dispersion and are designated as binders A, B, C, D, E, and F in the following table.

TABLE II.—BINDER COMPOSITIONS

| Designation | Composition | 300% p.s.i. | Refractive Index |
|---|---|---|---|
| A | 67% ethyl acrylate/33% methylmethacrylate | 556 | 1.4790 |
| B | 60% styrene/40% butadiene | 850 | 1.5560 |
| C | 75% vinyl acetate/25% butylacrylate | 257 | 1.4650 |
| D | 54% ethyl acrylate/6% butylacrylate/40% methyl methacrylate | 860 | 1.474 |
| E | 85% vinylidene chloride/15% butyl acrylate | 760 | 1.573 |
| F | 70% butylacrylate/30% vinyl chloride | 1,125 | 1.481 |

Various formulations employing the binders identified in Table II and the spherical particles in Table I are prepared and a composition is set forth in Table III.

TABLE III

| Ingredients | Percent Solids | Formulation 1 | 2 | 3 | 4 | 5 | 6 | 7 | 8 | 9 |
|---|---|---|---|---|---|---|---|---|---|---|
| Binder A (Fig. 1) | 47 | | | | 171.3 | | | 171.3 | | |
| Binder B | 47 | | | | | | | | 149.0 | |
| Binder C | 47 | | | | | 174.0 | | | | |
| Binder D | 47 | 220.2 | 195.7 | 171.3 | | | | | | |
| Binder E | 47 | | | | | | | | | 225.2 |
| Binder F | 47 | | | | | | 178.4 | | | |
| Microsphere I | 38.2 | 31.2 | 62.3 | 93.5 | 93.5 | 93.5 | 93.5 | | | |
| Microsphere II | 37.7 | | | | | | | | | |
| Microsphere III | 38.5 | | | | | | | 92.0 | | |
| Microsphere IV | 34.6 | | | | | | | | | |
| Microsphere V | 37.3 | | | | | | | | | |
| Microsphere VI | 34.0 | | | | | | | | 92.6 | 92.6 |
| Acrysol GS [1] | 5.0 | 10.0 | 10.0 | 10.0 | 10.0 | 10.0 | 10.0 | 10.0 | 10.0 | 10.0 |
| Water | | 30.6 | 25.0 | 19.2 | 19.2 | | | | | |
| Percent Solids | | 39.6 | 39.6 | 39.6 | 39.6 | 42.5 | 42.7 | 42.2 | 40.3 | 42.1 |
| Microsphere Volume Conc., percent | | 10 | 20 | 30 | 30 | 30 | 30 | 30 | 30 | 30 |

[1] Sodium polyacrylate thickener from Rohm & Haas.

The formulations of Table III are cast into 10 mil films and dried at a temperature of about 70° Fahrenheit. The films are removed from their support and evaluated for opacity, gloss, and the like. The results are set forth in Table IV together with the properties of film formed from the binder without the spherical particles.

illustrations are evaluated for antiburnishing properties by rubbing briskly with a soft cloth for a sufficient length of time with sufficient vigor to cause the coating to have a shiny appearance. On standing at about 25° centigrade for a period of from 10–24 hours the coatings recover their normal flat appearance.

TABLE IV

| Formulation No. | Microsphere No. | Percent by Volume | Latex Designation | Percent by Volume | Visual Clarity | Percent Gloss on Tin | | Percent Gloss on Glass | | Percent Gloss on Black Paper | | Percent Opacity |
|---|---|---|---|---|---|---|---|---|---|---|---|---|
| | | | | | | 60° | 85° | 60° | 85° | 60° | 85° | |
| 1 | 1 | 10 | D | 90 | Clear | 96 | 41 | 37 | 32 | 40 | 24 | 5.3 |
| 2 | 1 | 20 | D | 80 | do | 42 | 20 | 17 | 15 | 18 | 10 | 5.4 |
| 3 | 1 | 30 | D | 70 | do | 17 | 8 | 10 | 9 | 9 | 4 | 5.4 |
| 4 | 1 | 30 | A | 70 | do | 16 | 9 | 11 | 9 | 8 | 5 | 5.0 |
| 4 | 1 | 30 | C | 70 | Very slight haze. | 14 | 8 | 12 | 10 | 10 | 7 | 5.9 |
| 6 | 1 | 30 | F | 70 | Clear | 16 | 9 | 10 | 8 | 9 | 6 | 5.0 |
| 7 | 2 | 30 | A | 70 | Slight haze | 13 | 8 | 11 | 7 | 7 | 5 | 5.7 |
| 8 | 6 | 30 | B | 70 | do | 14 | 9 | 11 | 9 | 9 | 6 | 5.7 |
| 9 | 6 | 30 | E | 70 | Clear | 18 | 9 | 10 | 5 | 12 | 6 | 5.2 |
| | | | A | 100 | do | 100 | 100 | 100 | 100 | 83 | 93 | 5.0 |
| | | | B | 100 | do | 100 | 100 | 100 | 100 | 83 | 93 | 5.0 |
| | | | C | 100 | do | 100 | 100 | 100 | 100 | 83 | 93 | 5.0 |
| | | | D | 100 | do | 100 | 100 | 100 | 100 | 83 | 93 | 5.0 |
| | | | E | 100 | do | 100 | 100 | 100 | 100 | 83 | 93 | 5.0 |
| | | | F | 100 | do | 100 | 100 | 100 | 100 | 83 | 93 | 5.0 |

The above coatings are applied to oak, rosewood, birch, and provided attractive flat transparent coatings through which the detail of the grain is readily observed. Each of the coating formulations is also applied to the face of a 21 inch cathode ray tube in a television set. The resultant coating made a substantially glare and reflection free first surface on the viewing screen and do not observably detract from the picture quality.

A plurality of formulations are prepared embodying some of the hereinbefore described components in order to illustrate the effect of the particle size on the resultant coatings. The results are set forth in Table V.

Similar beneficial results are obtained when polypropylene spheres having a diameter of about 10 microns and a refractive index of 1.49, a heat distortion temperature of about 145° Fahrenheit are incorporated at a 10, 20, 30 and 40 percent volume concentration in a binder consisting of a copolymer of 67 percent ethyl acrylate and 33 percent methyl methacrylate. Similar advantageous results are obtained when the polypropylene spheres are replaced with ethyl cellulose spheres of diameters of 3 microns, 10 microns or 20 microns and having a refractive index of 1.47 and a heat distortion temperature of about 225° Fahrenheit. Similar beneficial and advantageous coat-

TABLE V

| Ingredients | Percent Solids | Average Particle Size, microns | 1 | 2 | 3 | 4 | 5 | 6 | 7 | 8 | 9 |
|---|---|---|---|---|---|---|---|---|---|---|---|
| Binder | 46.0 | | 195.5 | 174.0 | 152.0 | 195.5 | 174.0 | 152.0 | 195.5 | 174.0 | 152.0 |
| Microsphere 7 | 44.0 | 6 | 22.7 | 45.4 | 68.1 | | | | | | |
| Microsphere 8 | 40.8 | 10 | | | | 24.5 | 49.0 | 73.5 | | | |
| Microsphere 9 | 45.1 | 14 | | | | | | | 22.2 | 44.4 | 66.6 |
| Elvanol 51-05 [1] | 10.0 | | 14.0 | 14.0 | 14.0 | 14.0 | 14.0 | 14.0 | 14.0 | 14.0 | 14.0 |
| Acrysol GS [2] | 5.0 | | 8.0 | 8.0 | 8.0 | 8.0 | 8.0 | 8.0 | 8.0 | 8.0 | 8.0 |
| Water | | | 50.8 | 49.6 | 49.0 | 49.0 | 46.0 | 43.5 | 51.3 | 50.6 | 50.4 |
| Percent solids | | | 35 | 35 | 35 | 35 | 35 | 35 | 35 | 35 | 35 |
| Pigment volume concentration, percent | | | 10 | 20 | 30 | 10 | 20 | 30 | 10 | 20 | 30 |
| 60° gloss readings [3] | | | 32.0 | 15.0 | 10.0 | 31.0 | 13.5 | 16.0 | 26.0 | 12.0 | 9.5 |
| 85° gloss readings | | | 37.0 | 17.0 | 9.5 | 27.0 | 8.0 | 11.0 | 15.5 | 4.5 | 3.0 |
| Percent light transmission | | | 89.0 | 87.8 | 87.4 | 88.9 | 87.8 | 88.0 | 88.8 | 87.7 | 87.4 |
| Appearance of brushed coatings on wood | | | ([4]) | ([4]) | ([4]) | ([4]) | ([4]) | ([4]) | ([4]) | ([4]) | ([4]) |

[1] Polyvinyl alcohol thickener from E. I. du Pont.
[2] Sodium polyacrylate thickener from Rohm & Haas.
[3] Cast ionic wet films on glass.
[4] Uniform.

The above formulations of Table V are applied to both wood and glass surfaces. The coatings of the foregoing ings are prepared from high density polyethylene spheres having a refractive index of 1.54 and a heat distortion temperature of 105° Fahrenheit and a binder comprising a copolymer of 60 parts styrene and 40 parts butadiene having a refractive index of 1.5560 modulus of elasticity of 800 pounds per square inch at 300 percent elongation. Polyester spheres having a diameter of 10 to 15 microns and a heat distortion temperature of 190° Fahrenheit are also incorporated in the styrene-butadiene latex to prepare a coating composition which provided similar beneficial results. The polyester particles comprised are the condensation product of 29.9 parts maleic anhydride, 27.1 parts phthalic anhydride, 15.9 parts ethylene glycol, 27.1 parts diethylene glycol, 42.8 parts styrene, 0.5 parts benzoyl peroxide, and all parts being by weight. Other beneficial and advantageous coatings are prepared using the formulation procedure employed in the preparation of the samples of Table III wherein the following components are employed in weight percentages of 10, 20 and 40 percent by volume of the microspheres based on the dry weight of the coating to provide flat antiburnishing finishes.

TABLE VI

| Microsphere Polymer Composition | Refractive Index | Heat Distortion Temp., °F. | Binder Designation | Refractive Index |
|---|---|---|---|---|
| Styrene/acrylonitrile (70/30) | 1.566 | 230 | B | 1.556 |
| Vinyl chloride/vinyl acetate (90/10) | 1.487 | 172 | A | 1.479 |
| Vinyl chloride/vinylidene chloride (70/30) | 1.540 | 169 | B | 1.556 |
| Styrene/α-methylstyrene (75/25) | 1.577 | 186 | B | 1.556 |
| Stryene/divinylbenzene (95/5) | 1.58 | 198 | B | 1.556 |

As is apparent from the foregoing specification, the method and coating of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An article comprising a substrate carrying a non-reflective or flat continuous solid transparent coating comprising a synthetic resinous matrix, the matrix being generally transparent to light and having a modulus of elasticity at 300 percent elongation of from about 230 pounds per square inch to about 1450 pounds per square inch at 75° Fahrenheit and at 50 percent relative humidity, the matrix being sufficiently flexible that a three mil thick dry film thereof adhered to a 10 mil thick steel panel may be bent about a ⅛ inch diameter mandrel without cracking, the matrix containing from about 10 to about 40 volume percent of solid transparent resinous plastic spheres having a diameter of from about 3 to about 20 microns, the matrix being of such a nature that it does not attack or destroy the spheres, the transparent spheres having a heat distortion temperature of at least 100° Fahrenheit, the difference in refractive index of the spheres and the matrix being not greater than about 0.03, the coating having a 60° gloss measurement of not over 16 percent and an 85° gloss measurement of not over 11 percent and an opacity not greater than about 6 percent.

2. The article of claim 1 wherein the substrate is wood.

3. The article of claim 1 wherein the substrate is glass.

4. The article of claim 3 wherein the glass substrate is the viewing surface of a cathode ray tube.

5. The article of claim 1 wherein the spheres have diameters of from about 5–15 microns.

6. The article of claim 1 wherein the difference in refractive index between sphere and matrix is less than about 0.015.

7. The article of claim 1 wherein the volume percentage of spheres in the dry coating is from about 25 to about 35 volume percent.

8. The article of claim 1 wherein the solid coating thickness is from about 2 to 15 mils.

9. A method of coating an article with a non-reflective or flat coating comprising depositing on at least a portion of the surface to be coated an aqueous dispersion containing a plurality of solid spherical plastic particles having a diameter of from about 3–20 microns and a heat distortion temperature greater than about 100° Fahrenheit admixed with a dispersion of a film forming synthetic resinous material which, in the form of the film, has a modulus of elasticity at 300 percent elongation of from about 230 to about 1450 pounds per square inch at 75° Fahrenheit at 50 percent relative humidity, the matrix being of such a nature that it does not attack or destroy the spherical particles, the proportion of spherical particles to latex solids being such that on drying, the spheres comprise from 10 to 40 volume percent and subsequently drying the aqueous dispersion to provide a flat adherent continuous solid transparent coating of desired thickness and containing the spherical particles.

References Cited

UNITED STATES PATENTS

| | | | |
|---|---|---|---|
| 3,037,955 | 6/1962 | Carman | 117—124 X |
| 3,306,763 | 2/1967 | Hoge | 260—29.6 X |
| 3,330,692 | 7/1967 | Ehrlich | 117—124 X |

FOREIGN PATENTS 557,680  6/1959  Canada.

ALFRED L. LEAVITT, *Primary Examiner.*

H. COHEN, *Assistant Examiner.*